Patented Mar. 16, 1937

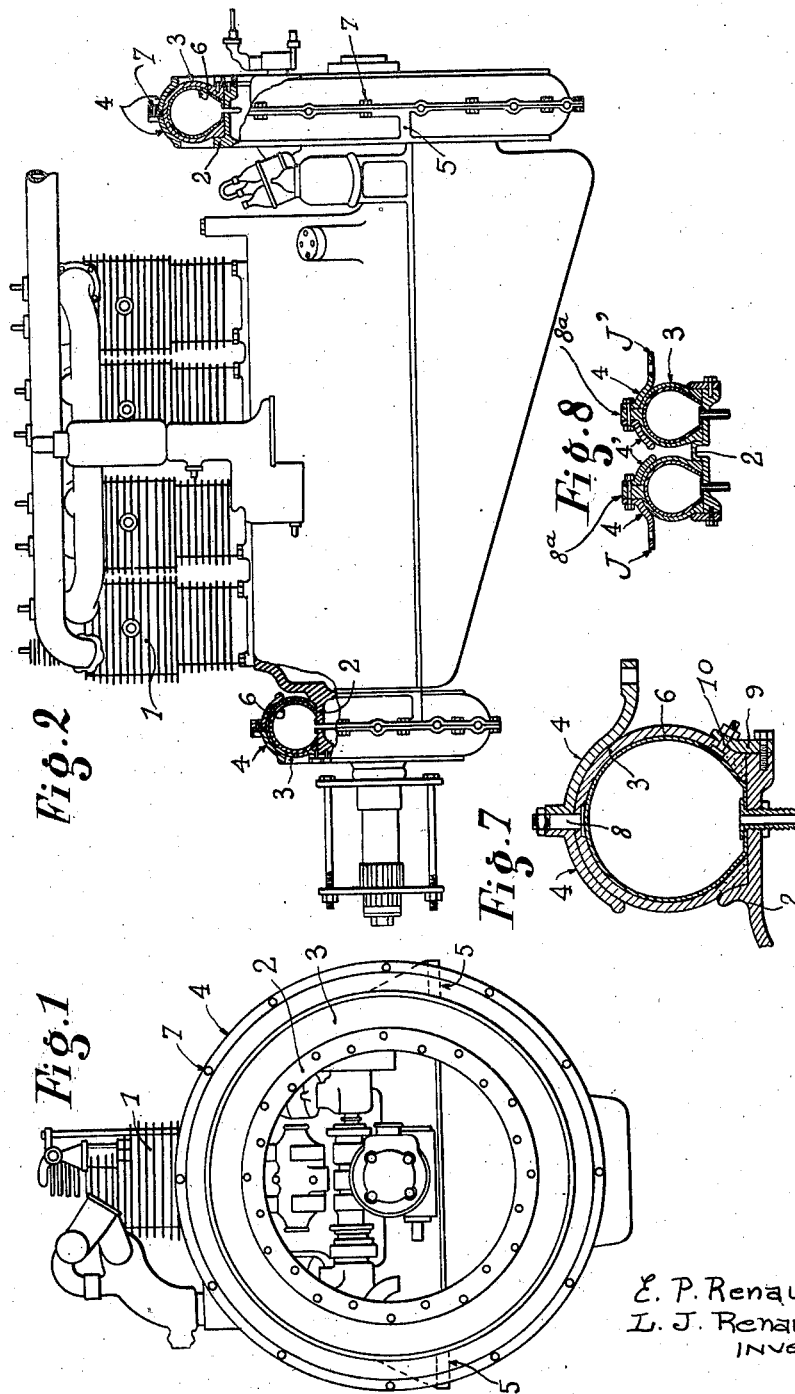

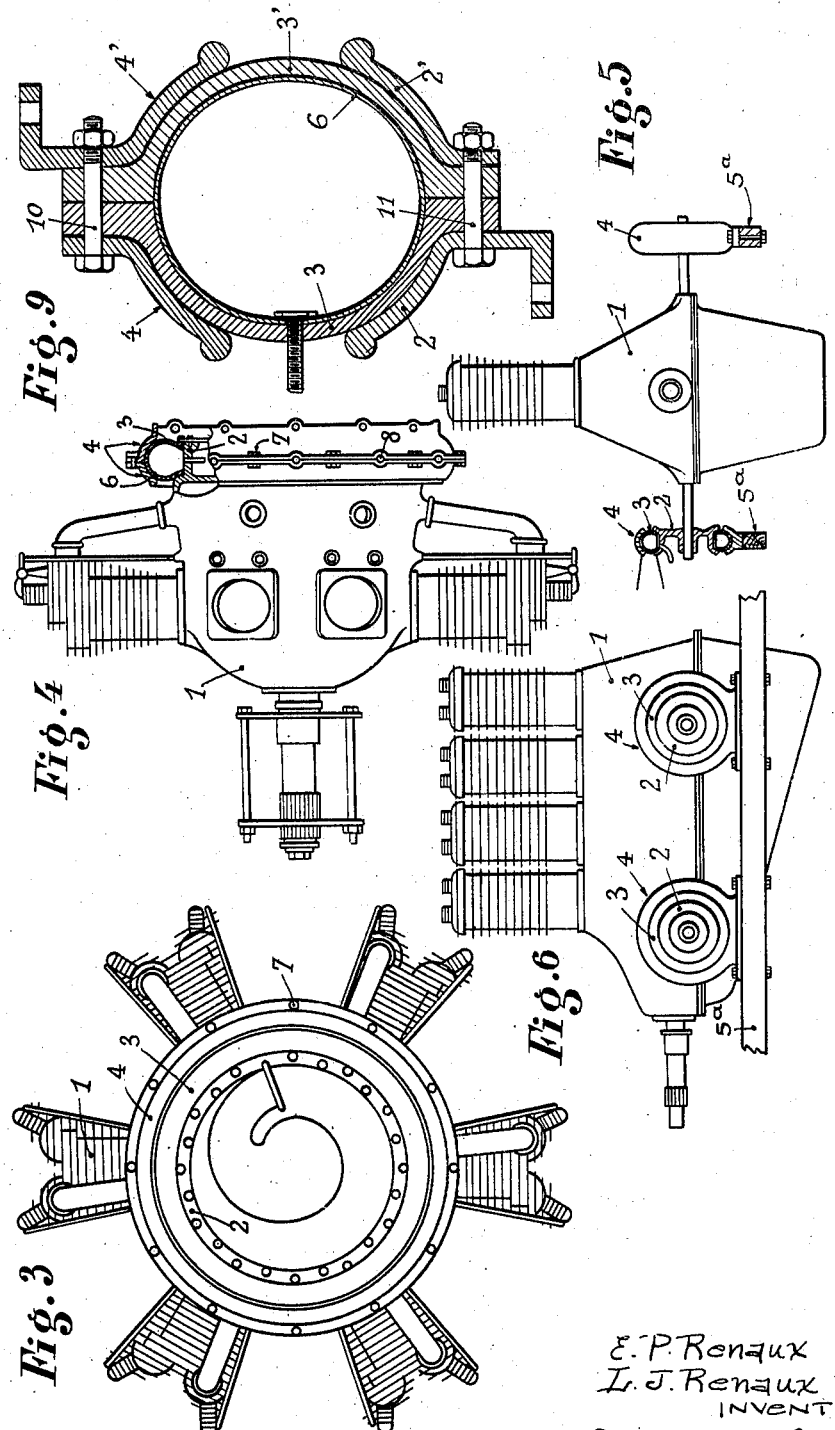

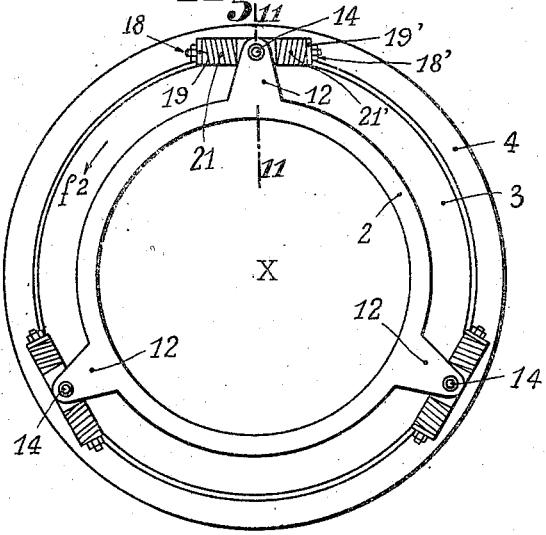
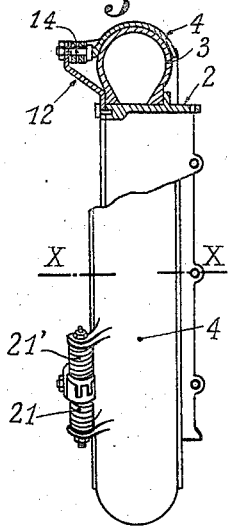
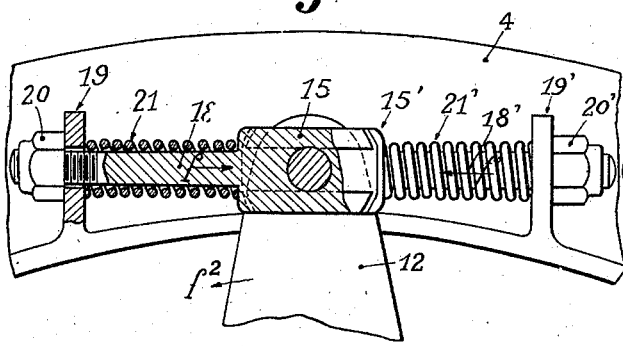
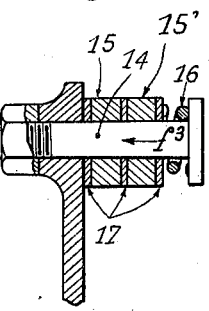
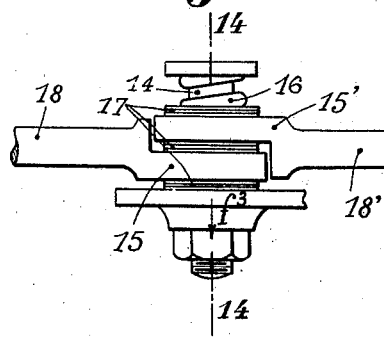
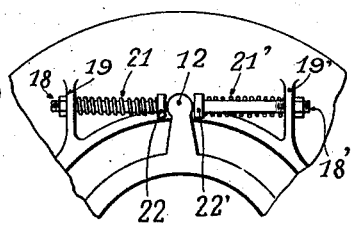

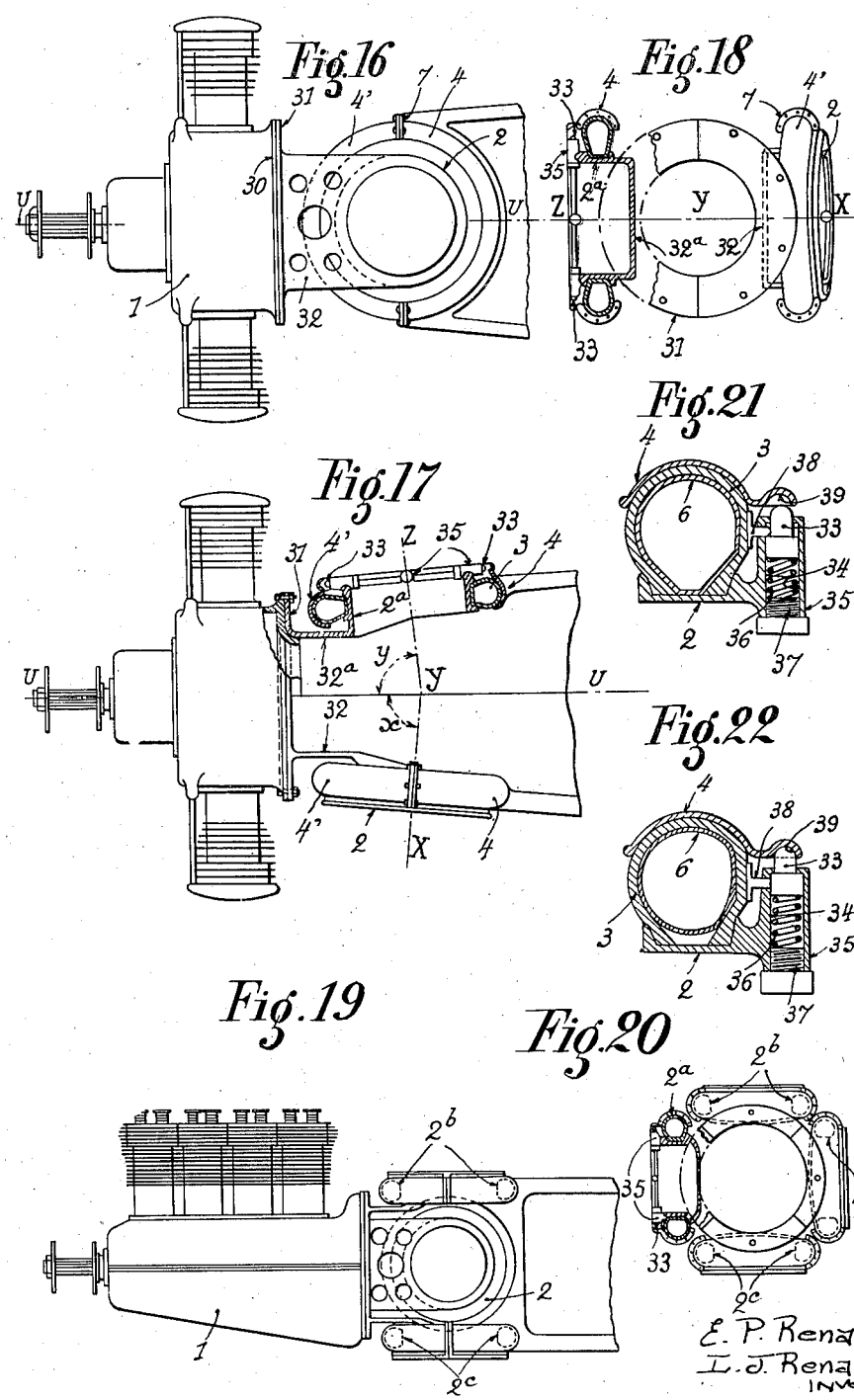

2,073,976

UNITED STATES PATENT OFFICE 2,073,976

DEVICE FOR THE MOUNTING OF ENGINES

Eugene Prosper Renaux, Paris, and Lucien Jules Renaux, Livry-Gargan, France

Application June 22, 1933, Serial No. 677,158 In France July 5, 1932

7 Claims. (Cl. 248—5)

It is a known fact that the reactions due to driving torque have a destructive effect upon the aggregate of the constituent parts of vehicles and aeroplanes. The necessarily light construction of the aeroplanes and the high power employed, show the advantage to be obtained in damping the reactions of the driving torque, which produce considerable vibrations when the engine and propeller group operates in an irregular manner.

The present invention relates to an improved device for mounting an engine upon its support, which may be for instance the fixed frame of a testing bench, or the chassis of a land or sea vehicle, or for mounting an engine and propeller group upon the structure of an aeroplane.

The said mounting device is chiefly characterized by the fact that it consists of one or more pneumatic rings which are interposed between the engine and its support, or between the engine and propeller group of an aeroplane and the structure of this latter.

In the accompanying drawings, which are given solely by way of example:—

Fig. 1 is an end view of the engine and propeller group of an aeroplane, which is secured to the structure of the latter by means of two devices in conformity to the invention, whose planes are substantially perpendicular to the engine shaft.

Fig. 2 is a corresponding side view, with parts broken away.

Fig. 3 is an analogous front view in the case of an engine of the radial type.

Fig. 4 is a corresponding side view.

Fig. 5 is an end view of an engine secured to the structure of an aeroplane by means of four devices according to the invention.

Fig. 6 is a corresponding side view.

Fig. 7 is a section on a larger scale of one of the mounting devices in conformity to the invention.

Fig. 8 is a sectional view of a modification comprising a pair of elastic rings.

Fig. 9 is a like view of another modification.

Fig. 10 is a front view of a mounting device according to the invention, provided with safety parts.

Fig. 11 is a corresponding side view, with partial section on the line 11—11 of Fig. 10.

Fig. 12 is a front view, with parts broken away and on a larger scale, of one of the groups of safety devices.

Fig. 13 is a corresponding partial plan view.

Fig. 14 is a section on the line 14—14 of Fig. 13.

Fig. 15 is a diagrammatic view showing a modified safety device.

Fig. 16 is a side view of an engine and propeller group of an aeroplane which is mounted on the structure of the latter by means of two lateral pneumatic rings whose planes are substantially parallel to the engine shaft.

Fig. 17 is a corresponding plan view, with parts broken away.

Fig. 18 is an end view with parts broken away, the engine being supposed to be removed.

Figs. 19 and 20 represent a modification.

Fig. 21 is a partial radial section of a pneumatic ring with its securing device, this combination being provided with a safety system adapted to prevent the separation of the two hoop-shaped members which are connected by said ring, in case the latter should collapse.

Fig. 22 is a like section, after the collapsing of the ring.

Figs. 1 and 2 show the method of mounting of an aviation engine with cylinders in line, in conformity to the invention. At each end of the engine 1, an internal rim 2 is secured to the engine crank-case, and is adapted to receive a flexible chamber 3. An outer rim 4 made, in one or more pieces and secured to the structure of the aeroplane, surrounds the flexible chamber 3. In the interior of the chamber 3 is an inner tube 6, inflated with air according to requirements, which affords a connection between the parts 2 and 4, and this connection will be more rigid according as the pressure is greater.

Figs. 3 and 4 show the mounting of an engine of the radial type, by the same method. The outer rim 4 is secured to the structure of the aeroplane, and the inner rim 2 is secured to the engine.

In the construction shown in Figs. 5 and 6, the engine is secured at several points. The engine and the structure upon which it is mounted are separated from one another by four pneumatic devices, each comprising an outer rim 4 secured to the structure 5ᵃ of the aeroplane, an inner rim 2 secured to the engine 1, and a flexible chamber 3 by which they are connected together.

In all these arrangements, the outer rim may be made of a single piece, or preferably of two pieces which are connected together by bolts and nuts 7 (Figs. 1 to 4), and this division into several parts facilitates the mounting.

To provide for leakage from the chamber 3, due to a loss of pressure, a safety connection between the inner rim 2 and the outer rim 4 may be assured for instance as shown in Fig. 7. A bolt 8 connects the chamber 3 with the outer rim 4.

This arrangement can be replaced, as shown in Fig 8, by a suitable rib 8ª which pertains to the chamber 3 and is bolted between the cheeks 4 and 4' forming the outer rim.

The inner rim 2 (Fig. 7) comprises a ring 9 which is bolted to the rim and is also secured to the beaded edge of the flexible casing by a safety bolt 10.

Fig. 9 shows an arrangement in which the flexible chamber consists of two cheeks 3 and 3', secured by bolts 10 and 11, respectively between the two members 4 and 4' of the outer rim, and between the two members 2 and 2' of the inner rim.

Fig. 8 shows a double pneumatic connection, in which the outer rims J and J' are secured respectively to the engine 1 and to the aeroplane structure. They are connected together by a double inner rim 2. In this figure, the chambers 3 are secured to the rims by the means above described.

Obviously, the number of coupled rings is not limited to two. The several coupled rings may be placed side by side and in the parallel position, or may have the concentric position.

The rims may have the inverted position, thus securing the rim 2 to the structure and the rim 4 to the engine, without prejudice to the operating of the system.

Figs. 1, 2, 5 and 6 show that the system is suitable for motor vehicles.

Obviously, in the case of an engine and propeller group, the chamber or chambers 3 will transmit the effort of traction.

Each of the connecting devices, or certain of these latter, will be preferably provided with safety devices adapted to limit the stresses supported by the chamber 3 either in its plane, under the action of the driving torque, or outside of its plane under the action of the effort of traction or of the gyrostatic couple.

In the form of construction shown in Figs. 10 to 14, the inner rim 2 comprises a certain number of radial arms 12. At the end of each arm is mounted a spindle 14, upon which two forks 15—15' are slidable, the forks being pressed against the arm 12 by a spring 16 (Figs. 13 and 14); friction washers 17 are mounted between the different members.

The forks 15—15' form the ends of respective rods 18—18' which are slidable in lugs 19—19' pertaining to the outer ring 4. Nuts 20—20' are screwed on the threaded ends of the rods 18—18', and limit the motion of said rods in the direction of the arrows $f$ and $f'$, respectively, under the action of springs 21—21' whereof one end is in contact with the lugs 19—19' and the other end with the forks 15—15'.

The operation is as follows: Under the effect of the variations of the driving torque, the rim 2 is displaced, in its own plane, with reference to the rim 4, by oscillation about the axis X—X. The oscillation is supposed to take place in the direction of the arrow $f$ (Figs. 10 and 12). The arm 12 moves the spindle 14, which latter bears against the inner end of the fork 15 and moves it in the direction contrary to the arrow $f$, while compressing the spring 21. If the oscillation has but a small amplitude, it will be taken up by the chamber 3 and the reaction spring 21. Should it be quite considerable, due to great variations in the driving torque, when the spring 21 is entirely compressed, a direct connection is formed between the rims 2 and 4 by means of the arm 12, the fork 15, the spring 21 and the lug 19. During the whole movement of the fork 15 and rod 18, the fork 15' and the rod 18' have not moved, as the nut 20' is in contact with the lug 19'.

During the return movement to the middle position, the fork 15 accompanies the spindle 14 under the action of the spring 21, until the nut 20 again makes contact with the lug 19.

During the oscillations of the lugs 12 in the contrary direction to the arrow $f$, the operation is symmetrical to the preceding.

On the other hand, under the effect of a traction stress or of a gyrostatic couple, the middle plane of the rim 2 tends to become separated from the middle plane of the rim 4, either by a straight movement (under traction stress) or by a movement of oscillation (in the case of a gyrostatic couple).

During these movements, the lug 12 draws upon the spindle 14 in the direction of the arrow $f^3$ (Figs. 13 and 14), or on the contrary, it presses upon the forks 15 and 15', in the contrary direction to the arrow $f^3$. In either case, the spring 16 is compressed. As long as the spring 16 is not entirely compressed, the chamber 3 and the spring 16 will transmit the stress exerted upon the rim 2 to the rim 4. In the case of excessive stresses corresponding to considerable movements of the rim 2 with reference to the rim 4, the spring 16 will be entirely compressed, and a direct connection between the rims 2 and 4 is obtained by the arm 12, the spindle 14 and the forks 15—15'.

Fig. 15 shows a simpler form of construction, in which the ends of the arm 12 is simply mounted between the heads 22—22' of the rods 18—18'. This arrangement can chiefly be used on the testing bench in order to measure the driving torque.

Figs. 16, 17 and 18 show the method of mounting an aviation engine of the radial cylinder type, according to the invention, with two pneumatic rings whose planes are substantially parallel to the engine shaft. In the rear of the engine 1, a ring-shaped member 31 is secured to an annular flange 30; said member consists preferably of several parts, and is provided with two metallic cheeks 32 and 32ª, with which are integrally formed, by casting or otherwise, two rims 2 and 2ª. The axes X—Y and Y—Z of said rims are for instance horizontal. They may be in line with one another, or they may cross each other by forming an angle. In the first case, they are perpendicular or normal to the longitudinal axis U—U of the engine; in the second case, they are oblique to the said axis, and the angles $x$ and $y$ (Fig. 17) are optionally equal and may have any value.

Each of the rims 2 and 2ª are provided with a pneumatic ring which may consist of a flexible chamber 3 of india rubber or of canvas treated with india rubber. The said chamber 3 is surrounded by an outer metallic ring consisting of two parts 4 and 4' which are connected together by bolts 7 and are secured to the structure of the aeroplane.

In the interior of the chamber 3 is an inner tube 6, properly inflated, which makes a suitable connection between the respective members 2—2ª and 4—4'. This connection will be more rigid according as the pressure is higher, in the case of a pneumatic device with variable pressure.

Figs. 19 and 20 represent a modification in which the connection between the engine 1 and the structure of the aeroplane is assured by two lateral pneumatic rings 2 and 2ª, an upper ring 2ᵇ and a lower ring 2ᶜ.

In all the mounting devices above described and due to the said pneumatic devices, the rims 2 and 4 may assume relative movements, firstly movements of oscillation about their common axis under the action of variations of the driving torque, and secondly, movements of oscillation outside of their middle plane, for instance under the effect of the gyrostatic couple, due to variations in the direction of the engine and propeller group.

The connection in conformity to the invention even provides for great oscillations, which may be caused for instance by an improper working of the engine group and particularly when the pneumatic rings are mounted as shown in Figs. 16 to 20. It is known, in fact, that pneumatic rings have a very reduced flexibility or yielding effect in a tangential direction or perpendicularly to their diameter and on the contrary an efficient flexibility in a diametrical direction, for in said latter direction, they may give way to the most various deformations according to the different efforts to which they are subjected. It is for this reason that a plurality of pneumatic rings laterally disposed with relation to the engine shaft are adapted to support the engine shaft with much more flexibility than the pneumatic rings surrounding the engine shaft and situated in a plane which is perpendicular to said shaft, for under the gyrostatic efforts of the propeller, the pneumatic rings disposed as shown in Figs. 16 to 20 are adapted to work more efficiently and avoid the propeller shaft to be too considerably brought out of line with relation to the engine support or to the structure of the aeroplane.

In all these devices, in the case of a collapsing of the chamber 3 due to a loss of pressure, a safety connection between the inner rim 2 and the outer rim 4 may be assured by any suitable means, such as studs 33, each of which is located in a bore 34 in a cylindrical part 35 of the rim 2 (Figs. 21 and 22). Each stud 33 is urged radially to the exterior by a spring 36 (Figs. 21 and 22) in contact with a plug 37.

Each stud 33 is held back, against the action of a spring 36, by a catch 38 which is laterally applied against the pneumatic chamber 3. When the said chamber is inflated, the catch is maintained in place and the stud 33 is locked in the withdrawn position, as shown in Fig. 21. When the chamber collapses, the stud 33, under the action of the spring, drives back the catch 38 (Fig. 22). The stud is thus released and enters a recess 39 in the outer rim 4, which is thus connected with the rim 2, and especially if a certain number of such studs are uniformly distributed around the rim 2.

Obviously, the invention is not limited to the forms of construction herein described and represented, which are given solely by way of example. The pneumatic chambers 3 provided with inner tubes and operating at variable pressure may be replaced by any other pneumatic chambers with or without inner tubes, and chiefly by a pneumatic chamber operating at atmospheric pressure, without inner tube or valve, of what is termed the automatic pneumatic type.

In the constructions herein described, the engine is mounted on the lower rims 2, and the outer rims 4 are secured to the frame, but it is evident that the reverse method can be adapted, thus securing the engine to the outer rims 4, and the lower rims to the frame.

On the other hand, as concerns the connections between the engine and the controlling devices, which are situated at a distance, and for example within reach of the pilot, such connections may be made either in the usual manner by means of flexible parts enabling relative movements, or by providing the cheeks supporting the engine with extensions or appendages, leading to the pilot's place and directly carrying the controlling devices, which are thus not subject to the relative displacements of the engine and the frame.

Having now described our invention what we claim as new and desire to secure by Letters Patent is:

1. In a device for the mounting of an engine upon its support, at least one pair of cheeks secured on the engine and forming a sort of fork, an inner rim and an outer rim disposed concentrically to each other and secured respectively on each of said cheeks and on said support, and a pneumatic ring interposed between each concentric group of an inner rim and an outer rim.

2. In a device for the mounting of an engine upon its support, two pairs of cheeks secured on the engine laterally with relation to the engine shaft, and disposed substantially at right angles, each pair of cheeks forming a sort of fork, for each cheek an inner rim and an outer rim disposed concentrically to each other and secured respectively on said cheek and on said support, and a pneumatic ring interposed between each concentric group of an inner rim and an outer rim.

3. In a device for the mounting of an engine upon its support, at least one inner rim and one outer rim disposed concentrically to each other and secured respectively on said engine and on said support, one of said rims having a recess, a spring actuated stud carried on the other rim and adapted to be engaged into said recess and to be withdrawn out of said recess, a pneumatic ring interposed between said inner rim and said outer rim and adapted to be inflated with a gaseous medium and to press in this inflated state on said inner and outer rims, and retaining means carried and controlled by said pneumatic ring adapted to hold said stud in the withdrawn position when said ring is inflated and to release said stud when said ring is collapsed.

4. In a device for the mounting of an engine upon its support, a pair of cheeks secured on the engine and forming a sort of fork, an inner rim and an outer rim disposed concentrically to each other and secured respectively on each of said cheeks and on said support, a pneumatic ring interposed between each concentric group of an inner rim and an outer rim, whereby said engine and said support are adapted to be oscillated with relation to each other as well about the central axis of said rims as about a diameter of said rims, and for each group of concentric inner and outer rims an arm secured on said inner rim, an axle extending through said arm and provided with shoulders at its ends, on each side of said axle and in the peripheral direction a stop member secured on said outer rim, on each side of said axle a push-piece extending through said corresponding stop members and provided with a forked end engaging said axle, on each push-piece a spring bearing at one end on the corresponding stop piece and at the other end on said push-piece so as to urge said push-piece towards said axle, and spring means on said axle urging the forked ends of said push-pieces towards one end of said axle.

5. In a device for the mounting of an engine upon its support, a pair of cheeks secured on the engine and forming a sort of fork, an inner rim and an outer rim disposed concentrically to each other and secured respectively on each of said cheeks and on said support, a pneumatic ring interposed between each concentric group of an inner rim and an outer rim, whereby said engine and said support are adapted to be oscillated with relation to each other as well about the central axis of said rims as about a diameter of said rims, controlling devices situated at a distance from said engine, and appendages extending from said cheeks and on which said controlling devices are adapted to be secured.

6. In a device according to claim 1, the further feature consisting in that the rims and the pneumatic ring are situated in a plane obliquely disposed with relation to the engine shaft.

7. In an engine mounting for a radial engine, a supporting member and a supported member and an annular pneumatic tube interposed between said members for floatingly suspending the weight of the supported member upon the supporting member and for cushioning torque reactions and vibrations inherent in said engine, said members being provided with concentrically disposed annular clamping portions, having oppositely facing concave seats, one of said clamping portions frictionally engaging the inner circumference of said pneumatic tube, the other clamping portion engaging the outer circumference of said tube to prevent lateral displacement of said engine relative to said supporting member and auxiliary means common to said supporting and supported members for yieldably retaining said members in coupled relation upon deflation of said pneumatic tube.

EUGENE PROSPER RENAUX.
LUCIEN JULES RENAUX.